July 15, 1969 R. MICHENER ET AL 3,455,162
TURBINE FLOWMETER TRANSDUCER TRANSMISSION SYSTEM
Filed Jan. 24, 1967 2 Sheets-Sheet 1
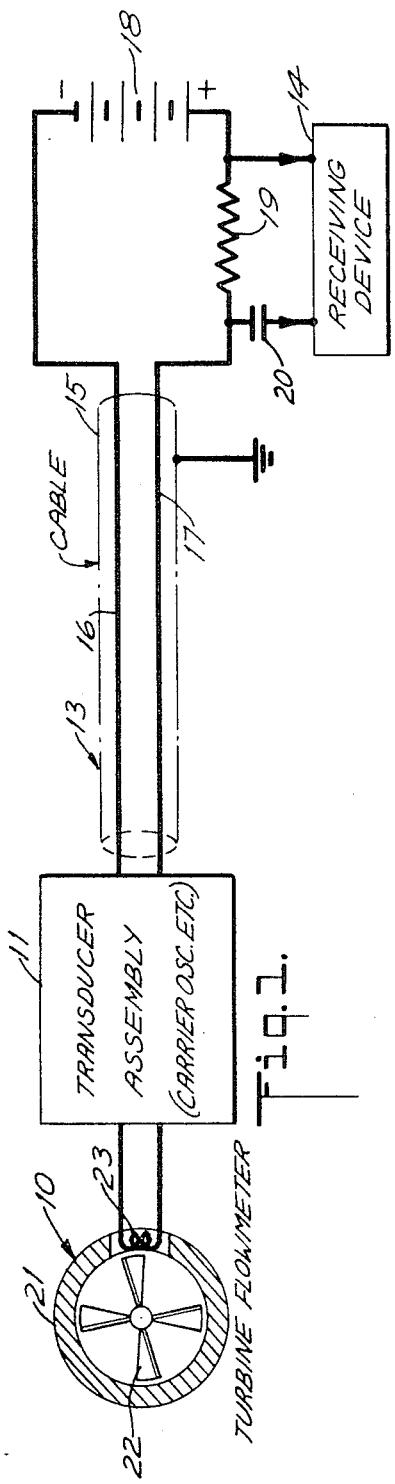
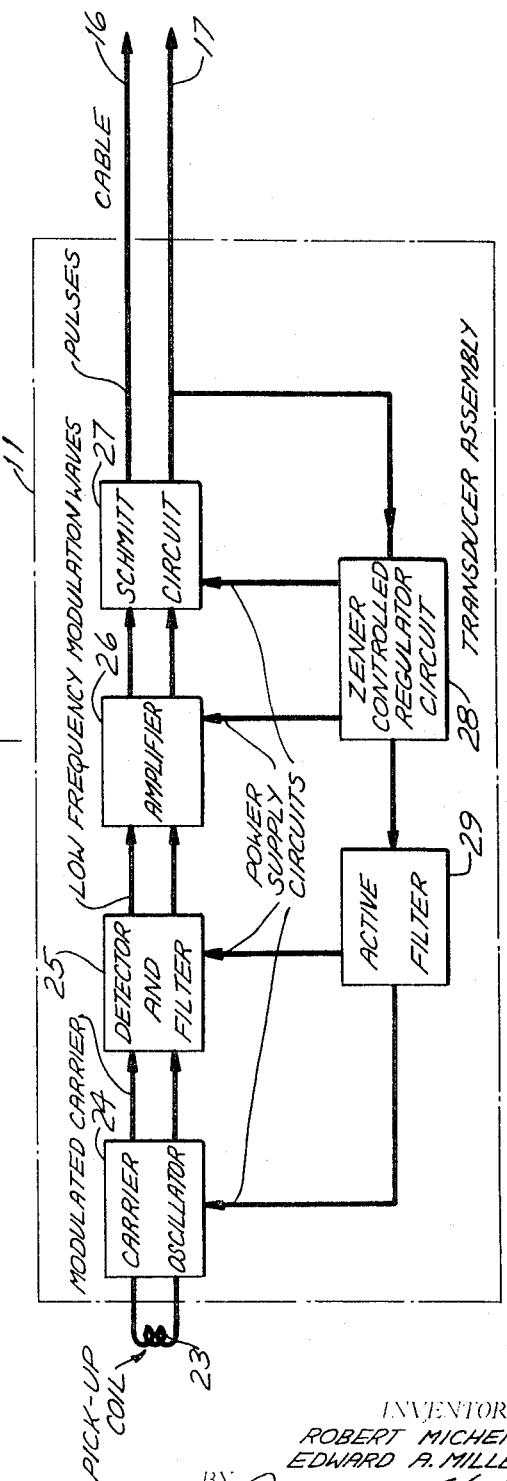
INVENTORS.
ROBERT MICHENER
EDWARD A. MILLER
BY
ATTORNEY

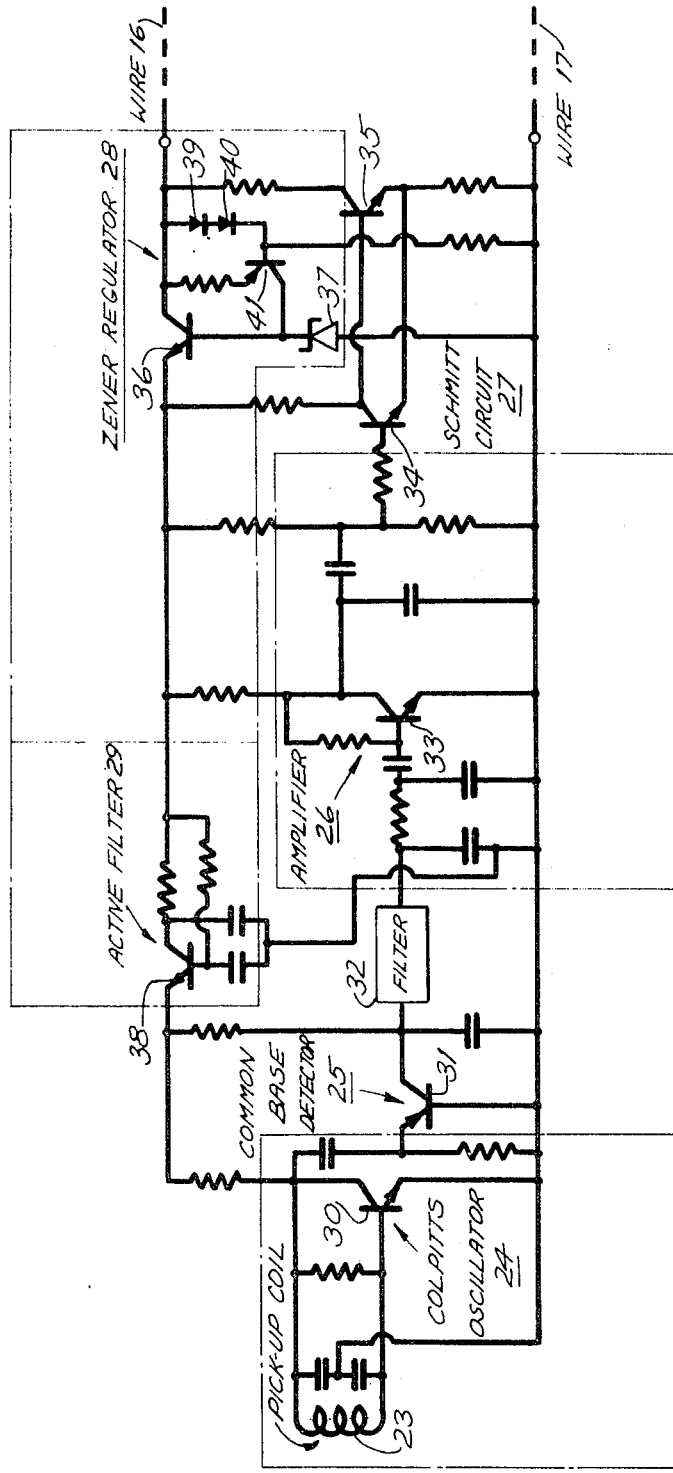

United States Patent Office
3,455,162
Patented July 15, 1969

3,455,162
TURBINE FLOWMETER TRANSDUCER TRANSMISSION SYSTEM
Robert Michener, Warrington, and Edward A. Miller, Hatboro, Pa., assignors to Fischer & Porter Co., Warminster, Pa., a corporation of Pennsylvania
Filed Jan. 24, 1967, Ser. No. 611,370
Int. Cl. G01f 1/04
U.S. Cl. 73—231
7 Claims

ABSTRACT OF THE DISCLOSURE

A turbine flowmeter transducer transmission system wherein fluid flowing through a conduit containing a turbine produces in a transducer assembly associated therewith, electrical pulses whose repetition rate depends on flow rate, these signal pulses being transmitted over a two-wire cable to an indicating device at a remote station, direct voltage taken from a source at this station being supplied to the power supply circuits of the transducer assembly over the same cable by means including a Zener-controlled regulator which removes the signal pulses.

---

This invention relates generally to a turbine flowmeter transducer transmission system wherein electrical pulses are generated at a repetition rate proportional to flow rate and are conveyed by cable from the transducer to an indicating device at a remote station, and more particularly to a system of this type having a cable formed by only two wires which serve to conduct a direct voltage taken from a source at the station to the power supply circuits of the transducer and simultaneously to transmit the signal pulses to the indicating device.

In one known form of turbine flowmeter transducer fluid to be measured flows through a flowmeter passage having a turbine therein which is caused to rotate at a rate depending on fluid flow. The turbine is constituted by an array of blades which include or are formed of ferromagnetic elements, the blades moving in relation to a self-generating reluctance pickup. As the turbine is caused by the fluid to rotate, each blade thereof cuts magnetic lines of flux and induces an A-C signal in the pickup coil. By amplifying, clipping and shaping circuits associated with the pickup coil, the A-C signal is processed to form a train of constant-amplitude square-wave pulses. These signal pulses are conveyed by a cable to a remote pulse counter for integration of flow, or to a device which affords an output signal proportional to pulse frequency to produce a measure of flow rate.

Among the advantages of using a pulse technique in the context of a turbine flowmeter transmission system, is that a high signal-to-noise ratio exists for rejecting extraneous electrical noise, the counter sensitivity can be fixed, and the counter or other receiving device may be located at a considerable distance from the turbine flowmeter.

In the reluctance-type pickup, the magnetic field imposes a drag on the blades, giving rise to inaccuracies at low flow rate values. While this drag can be minimized by diminishing the strength of the magnetic field, to do so would unduly reduce the amplitude of the transducer signal.

To overcome this drawback, the prior Patent 3,177,711 discloses an improved form of turbine flowmeter transducer wherein the turbine blades do not rotate in a magnetic field, but act to amplitude-modulate a high-frequency carrier signal. To this end, a pickup coil in the proximity of the turbine is included in the circuit of a high-frequency carrier oscillator, the movement of the blades relative to the fixed coil acting to change the inductance of the coil and thereby to amplitude-modulate the carrier oscillations. The amplitude envelope of the carrier is detected and processed to produce low frequency pulses of high amplitude which are proportioned to blade rotation and are conveyed over the cable.

In the transducer assembly associated with the pickup coil in the carrier-type system, the oscillator and other circuits are operated by direct-current power. Hence the cable connecting these circuits to the remote counter or indicating device requires lines for conducting the D-C power as well as for the signal pulses. Ordinarily, a cable having a minimum of three such lines is necessary for this purpose. Where the distance between the transducer assembly and the remote indicating device is considerable, such as five miles, the need for three or more wires in the transmission cable is disadvantageous.

Accordingly, it is the main object of this invention to provide a turbine flowmeter transducer transmission system in which a two-wire cable acts not only to supply power to the transducer assembly associated with the turbine, but also simultaneously to convey the output signals from the transducer to the receiving device.

More specifically, it is an object of this invention to provide a system of this type in which a Zener-controlled regulator coupled to the line acts to filter the pulses therefrom and to supply a direct-current voltage to the power supply circuits of the transducer assembly.

Briefly stated, these objects are accomplished in a system including a flowmeter having a turbine rotatably disposed within a fluid passage, the magnetically and/or electrically conductive blades of the turbine moving with respect to a fixed pickup coil. Associated with the turbine flowmeter is a transducer assembly including a high-frequency carrier oscillator which incorporates said pickup coil whereby the carrier is amplitude-modulated at a rate depending on the rate of turbine rotation, this rate being proportional to the rate of fluid flow. The output of the oscillator is detected to derive the amplitude envelope therefrom, the resultant low-frequency wave being converted into a train of rectangular signal pulses whose repetition rate is proportional to flow rate. The signal pulses are conducted by a two-wire line to a remote receiving station.

At the receiving station, the two-wire line is connected to a direct-voltage power supply and is also coupled to a receiving device through a signal forming resistance so that the line conveys both the pulses and the direct voltage. The composite voltage on the line is applied to the power supply circuits at the transducer assembly through a Zener-controlled regulator to provide a substantially constant direct voltage therefor.

For a better understanding of the invention as well as other objects and further features thereof, reference is made to the following detailed description to be read in conjunction with the accompanying drawing, wherein like elements in the several figures are identified by like reference numerals, In the figures:

FIG. 1 is a schematic diagram of a turbine flow-meter transducer transmission system in accordance with the invention;

FIG. 2 is a block diagram of the transducer assembly of the system; and

FIG. 3 is a schematic circuit diagram of the transducer assembly.

Referring now to FIGS. 1 and 2, there is shown a flowmeter transmission system in accordance with the invention, the system comprising a turbine flowmeter generally designated by numeral 10, and a transducer assembly 11 associated with the flowmeter to produce signal pulses at a rate proportional to the flow rate, which pulses are conveyed by a cable 13 to a receiving device 14.

The cable is constituted by a grounded outer sheath 15 which shields a pair of wires 16 and 17. Wire 16 is connected to the negative terminal of a direct-voltage source 18, while wire 17 is connected through a load resistor 19 to the positive terminal thereof. The D-C component of the signal is blocked by a capacitor 20. In practice, the value of resistor 19 may be 100 ohms for a 15-volt supply, and 200 ohms for a 24-volt supply, whereas the capacitor 20 is typically 10 mfd.

Flowmeter 10 includes a conduit 21 providing a fluid passage within which a rotatable turbine 22 is coaxially mounted. Turbine 22 is formed by blades radially extending from a hub. The blades are formed of magnetic or non-magnetic electrically conductive material, such as stainless steel, or other non-corrosive metal.

Disposed within the conduit 21 is a pickup coil 23 which is operatively associated with the turbine but isolated from the fluid in the passage coil 23 which serves as the tank inductance of a high-frequency oscillator 24 which, in practice, may be a standard Colpitts or Hartley oscillator. As the blades of the turbine pass the pickup coil, a change occurs in the inductance thereof. The oscillator operates at a high-frequency which may be in the range of 37 to 45 kilocycles or higher.

The movement of the conductive blades effects modulation of the oscillator such as to vary the amplitude of the carrier at a rate directly proportional to the frequency of passage of the blades past the pickup coil. The relationship of this frequency to flow rate depends on the number of blades on the turbine and the particular constant of the turbine.

The presence of a conductive metal adjacent the tank coil in the oscillator acts to vary the effective reactance in the feedback circuit thereof and hence the amplitude of oscillator. The peak amplitude of the oscillator will remain at a constant value if the operating power thereof is constant. While some degree of frequency-modulation is also encountered, this is not significant, for the detector, which is coupled to the oscillator, is mounted and therefore insensitive to frequency-moduation components. Thus the output of carrier oscillator 24 is a high-frequency carrier wave amplitude-modulated as a function of flow rate.

This output is applied to a detector and filter 25 which extracts the amplitude envelope from the carrier and discriminates against the carrier frequency to produce a low-frequency modulation wave reflecting the blade movement. This wave is suitably amplified in amplifier 26 and applied to a Schmitt circuit 27 or to any other suitable pulse generator to produce a train of pulses at a rate corresponding to the modulation frequency. The output of this pulse generator is connected to wires 16 and 17 of the cable.

As shown in FIGS. 1 and 2, the voltage from D-C source 18 is connected to the two-wire line through resistor 19, hence the pulses applied to this same line produce a pulsatory voltage drop across resistor 19 which is applied to the receiving device 14, which may be a pulse counter or other device adapted to provide an indication of flow rate.

Inasmuch as the two-wire line carries both the pulses from the transducer assembly and the direct voltage for powering the assembly, it is necessary, in order to provide a constant direct voltage for power supply purposes, to extract this voltage from the composite voltage on the line. To this end, a Zener-controlled regulator circuit 28 is provided to produce a constant-voltage output over a wide variation in input current.

Regulator circuit 28 is connected to the line to provide a substantially constant direct voltage for the power supply circuits of amplifier 26 and Schmitt circuit 27. For an even more stable direct voltage to operate oscillator 24 and detector 25, an active filter 29 is provided to further minimize power fluctuations. In one working embodiment, the Zener-controlled regulator provided a 6-volt output with less than 25 millivolts of output signal superimposed thereon, whereas the active filter reduced this residual signal noise to less than 6 millivolts.

Referring now to FIG. 3, the schematic circuit of the transducer assembly is shown. It will be seen that pickup coil 23 serves as the tank coil of a Colpitts oscillator, which includes a transistor 30, the carrier oscillations being modulated by the rotating turbine. The amplitude-modulated output of the oscillator goes to detector 25, which includes a transistor 31 in a common base arrangement, and a filter device 32 adapted to discriminate against the carrier frequency.

The low-frequency modulation wave yielded in the output of filter 32 is applied to amplifier 26, which includes a transistor 33 whose output is fed to Schmitt circuit 27 constituted by transistors 34 and 35, to produce a train of rectangular pulses at a rate corresponding to the frequency of the modulation wave, these pulses being applied to lines 16 and 17.

The Zener-controlled regulator circuit includes a regulating transistor 36 having a Zener-diode 37 in the base circuit thereof, the regulator transistor being connected in series with the line 16 and supplying a relatively constant power voltage to part of the Schmitt circuit and to the amplifier. The output of regulator transistor 36 goes to a second regulator transistor 38 serving as a further filter of the pulsatory line voltage to supply a more constant D-C to the oscillator and detector. Series-connected diodes 39 and 40 and transistor 41 act to produce a substantially constant current in Zener-diode 37.

While there has been shown and described a preferred embodiment of turbine flowmeter transducer transmission system in accordance with the invention, it will be appreciated that many changes and modifications may be made therein without, however, departing from the essential spirit of the invention as defined in the annexed claims.

We claim:

1. A turbine flowmeter transducer transmission system for conveying flow rate information in pulsatory form to a remote station provided with a receiving device for said pulsatory information and a direct-voltage source for energizing said transducer, said system comprising:

(A) a turbine flowmeter including a conduit forming a fluid passage and a turbine disposed within said passage, said turbine being constituted by a plurality of blades of conductive metal which rotate at a rate depending on the rate of fluid flow, (B) a transducer assembly including a high-frequency oscillator generating carrier oscillations and incorporating a pickup coil which is disposed in said conduit in operative relation to said turbine to effect amplitude-modulation of said carrier oscillations at a rate which is a function of blade rotation, and means coupled to said oscillator to produce a train of constant-amplitude pulses at a repetition rate corresponding to said modulation rate, (C) a two-wire line coupling the output of said pulse-producing means to said receiving device and said direct-current source at said remote station whereby said line carries a composite voltage formed by said pulses and said direct voltage, and (D) regulator means including a Zener-diode coupled to said line to derive from said composite voltage a substantially constant direct voltage, and for applying said direct voltage to the power supply circuits of said oscillator and said pulse-producing means.

2. A system as set forth in claim 1, wherein said oscillator is a Colpitts oscillator and said pickup coil is the tank inductance thereof.

3. A system as set forth in claim 1, wherein said pulse-producing means includes a detector coupled to the output of said oscillator to derive the low-frequency modulation wave therefrom, and a pulse generator responsive to said modulation wave to produce said train.

4. A system as set forth in claim 3, wherein said pulse generator in a Schmitt circuit.

5. A system as set forth in claim 1, wherein said direct-current source is connected to said two wires through a series resistor across which a pulsatory voltage is developed which is applied to said receiving device.

6. A system as set forth in claim 3, wherein said regulator means further includes an active filter to supply direct voltages to said oscillator and said detector.

7. A system, as set forth in claim 1, wherein said regulator means includes a transistor in series with said line, said Zener-diode being in the base circuit of said transistor.

References Cited

UNITED STATES PATENTS

| | | |
|---|---|---|
| 2,974,303 | 3/1961 | Dixon. |
| 3,101,615 | 8/1963 | Pavone _____ 73—231 |
| 3,177,711 | 4/1965 | Ham et al. _____ 73—231 |
| 3,319,255 | 5/1967 | Houle _____ 73—231 X |
| 3,301,053 | 1/1967 | Walch et al. _____ 73—231 |

RICHARD C. QUEISSER, Primary Examiner

EDWARD D. GILHOOLY, Assistant Examiner

U.S. Cl. X.R.

73—272; 340—201